UNITED STATES PATENT OFFICE.

HARRY G. AKERS AND WILLIAM PEROT KAUFMANN, OF TORONTO, ONTARIO, CANADA, ASSIGNORS TO MALT PRODUCTS COMPANY OF CANADA, LIMITED, OF TORONTO, ONTARIO, CANADA.

MALT PRODUCT.

1,256,634.  Specification of Letters Patent.  Patented Feb. 19, 1918.

No Drawing.  Application filed April 10, 1916.  Serial No. 90,231.

*To all whom it may concern:*

Be it known that we, HARRY G. AKERS and WILLIAM PEROT KAUFMANN, of the city of Toronto, in the county of York, Province of Ontario, Canada, have invented certain new and useful Improvements in Malt Products, of which the following is a specification.

For various reasons it is desirable to obtain malt products which while well adapted to bakers' use are unfit for use in the production of potable alcoholic liquors.

To attain this result it is necessary to find a "denaturing" ingredient, or ingredients which will so affect the flavor, appearance and keeping qualities of the alcoholic liquor obtained by its use, as to render it undrinkable and which will have no deleterious effect on the flavor of bread in the production of which it may be used.

It is also of great advantage to use a denaturing ingredient which will have a beneficial effect in panary fermentation.

We have discovered that the sprouts or "coombings" from malt when used in sufficient quantity possess the required characteristics and give the malt the property of imparting to beer and other alcoholic liquors a very disagreeable flavor. The coombings which normally sprout from a given quantity of malted grain are not sufficient for our purpose, though they are enough to impair the beverage brewed with them present, and coombings, which are ordinarily a waste product of malt houses, are added in the products which we have discovered to bring up the proportion of the coombings to the whole of the malt used to about 15% to 30%.

While coombings are probably the best "denaturing" ingredient for our purposes, other materials may be employed. For example, "vinasses" the residue in the distillation of alcohol from beet sugar or molasses contains much the same soluble ingredients as the coombings and may be substituted therefor.

Both "coombings" and "vinasses" contain similar soluble organic nitrogenous compounds and carbohydrates, and soluble compounds of phosphorus, potassium, magnesium and calcium which possess a bitter flavor.

The soluble organic and mineral matters of the denaturants have a valuable stimulating effect on panary fermentation.

The coombings may be introduced in various ways, for example, the coombings may be finely ground and added in proper proportion to malt flour or dry malt extract, or it may be added to the malt, mixed and ground therewith.

The coombings may also be extracted with hot or cold water the solution filtered off and concentrated if necessary and added to the malt.

The coombings also may be mashed with the malt and the mash subsequently treated to obtain malt products.

If green malt be used it may be taken with its coombings, and coombings added to give the proper percentage and the mixture milled and mashed.

The above examples are given as indicating a few only out of many ways of securing the proper combination with the malt of the coombings or the soluble constituents thereof.

What we claim as our invention is:—

1. As a new article of manufacture, a malt product adapted for bakers' use having as its principal constituent malt and containing less than 30% of a denaturing ingredient rendering it unfit for use in the production of potable alcoholic liquors and having no unfavorable effect or re-action on the diastase of the malt.

2. As a new article of manufacture, a malt product adapted for bakers' use having as its principal constituent malt and containing less than 30% of a denaturing ingredient rendering it unfit for use in the production of potable alcoholic liquors and more adapted to promote panary fermentation.

3. As a new article of manufacture, a malt product adapted for bakers' use containing less than 30% of a denaturing ingredient rendering it unfit for use in the production of potable alcoholic liquors and having no unfavorable effect or re-action on the diastase of the malt, comprising a mixture of soluble compounds of nitrogen phosphorus, potassium, magnesium, and calcium of a bitter flavor.

4. As a new article of manufacture, a malt product adapted for bakers' use containing less than 30% of a denaturing ingredient rendering it unfit for use in the production of potable alcoholic liquors comprising "coombings" in the proportion of approximately 15% to 30%.

5. As a new article of manufacture, malt products adapted for bakers' use containing less than 30% of "coombings" in sufficient proportion to render the malt unfit for use in the production of potable alcoholic liquors.

6. As a new article of manufacture, a malt product adapted for bakers' use containing less than 30% of a denaturing ingredient rendering it unfit for use in the production of potable alcoholic liquors comprising the soluble constituents of coombings in the proportion of approximately 15% to 30%.

Signed at Remford, Maine, this 28th day of March, 1916, by the said HARRY G. AKERS, and at Toronto, Canada, this 31st day of March, 1916, by the said WILLIAM PEROT KAUFMANN, in the presence of the undersigned witnesses.

HARRY G. AKERS.
WILLIAM PEROT KAUFMANN.

Witnessses as to signature of H. G. Akers:
  ARETAS E. STEARNS,
  MARY BROWN.

Witnesses as to signature of W. P. Kaufmann:
  J. EDW. MABIE,
  E. P. HALL.